July 23, 1940.  F. SCHNELL  2,209,141
MACHINE FOR MAKING PRESSED ARTICLES
Filed Aug. 17, 1937  2 Sheets-Sheet 1

Inventor:
F. Schnell
By: Glascock Downing & Seebold
Attys.

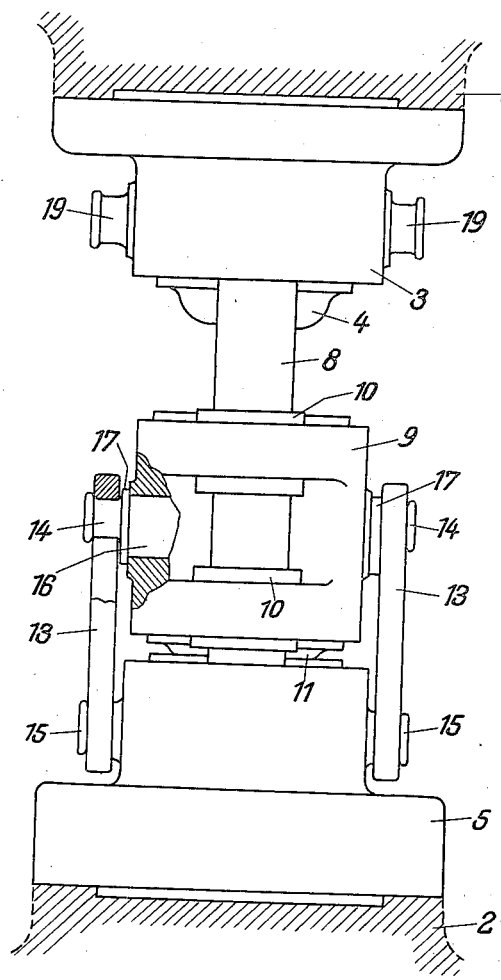

Patented July 23, 1940

2,209,141

UNITED STATES PATENT OFFICE 2,209,141

MACHINE FOR MAKING PRESSED ARTICLES

Fritz Schnell, Chemnitz, Germany

Application August 17, 1937, Serial No. 159,551
In Germany August 18, 1936

1 Claim. (Cl. 18—17)

This invention relates to a press for making articles of synthetic material which are pressed to the desired shape and require high pressure, as for example, artificial resin pressings made from a laminated material consisting of layers of paper or fabric impregnated with artificial resin. After the pressing operation the pressings must be cooled, while the high pressure is maintained, and this requires approximately the same time as the pressing. The presses, which are usually constructed as hydraulic presses, are not fully utilised, so that a poor return is obtained for the high installation costs.

The invention provides a press more particularly for making artificial resin pressings which require high pressure and are arranged one above another in the same place and the novelty consists in this, that in addition to the ordinary die and plunger, intermediate dies, which can be used as intermediate plungers, are provided which can be moved in the vertical direction with the main plunger, and preferably can be driven thereby. The advantage is that the pressing period can be shortened in accordance with the number of dies used, so that for example, when using two dies and two plungers in the same time, approximately twice as many pressings can be made as with the ordinary arrangements.

Two different methods are possible. Firstly the pressing of the individual parts and the subsequent cooling of the parts can be effected simultaneously, that is all the pressings are pressed with one stroke of the press and they cool together while the press is closed. Alternatively, it is possible to effect the pressing of the parts successively, that is, with two strokes of the press, and the cooling of the parts accordingly takes place successively. The advantage of this second method is that a smaller stroke of the press can be used and also that during the cooling of one pressing the workers are available for operating the free die.

The intermediate dies and plungers provided according to the invention may be guided on the same guiding rods as the main die and plunger. According to the invention preferably in each case an intermediate die is made integral with an intermediate plunger. In this way each intermediate die and plunger is of small height, so that the operation of such an intermediate die is considerably simplified.

A further useful feature of the invention is that the main die or the main plunger, or preferably the intermediate die, is provided with a locking device which can be attached to the adjoining parts. The advantage of this is that in the method in which the pressing and cooling operation takes place successively, the pressure during the cooling can be replaced by this locking device. For this purpose the locking device is preferably mounted on an eccentric shaft, by means of which it is given the necessary tension.

According to the invention the intermediate die is fitted with connections and pipe conduits for introducing cooling air or other medium. This provides the same good cooling possibility for the intermediate die as for the main die.

The drawings illustrate the device for carrying out the method in a constructional example.

Fig. 2 is a side elevation of the arrangement.

Figure 1:
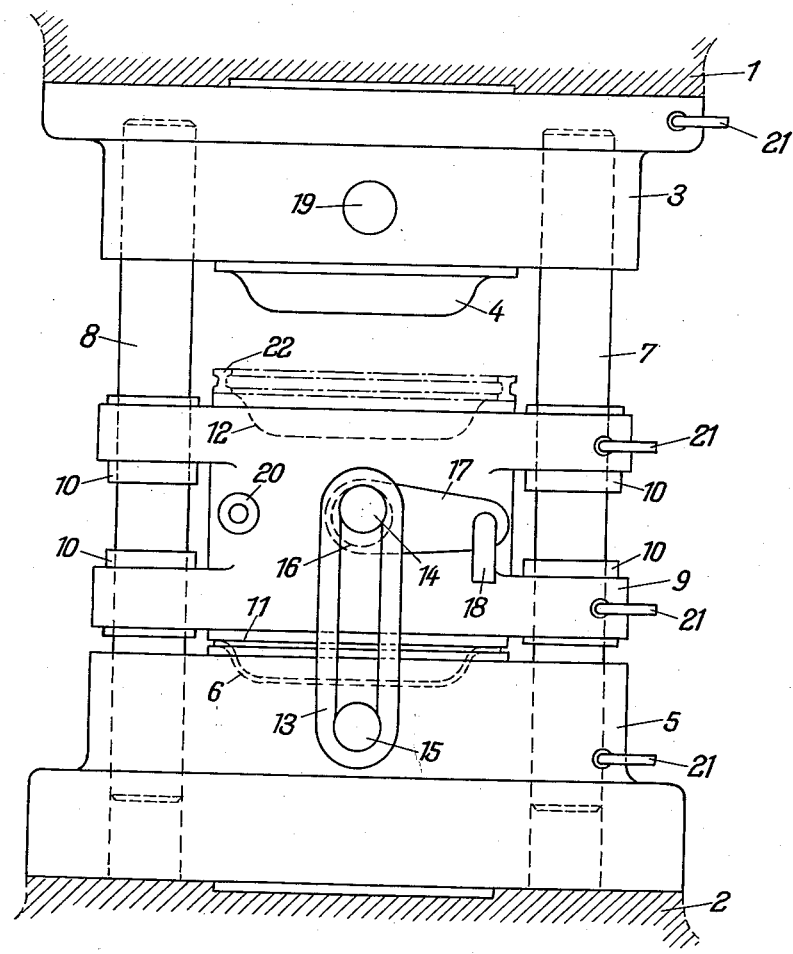
Fig. 1 shows the head and foot of a hydraulic press with main die, main plunger and intermediate die.

According to Fig. 1 an ordinary hydraulic press has a head 1 and a foot 2. On the head 1 is arranged a plunger 3 with plunger head 4, the head 4 being constructed in the shape of the pressing to be made. On the foot 2 of the press is provided a die 5, the moulding part 6 of which also has the same shape as the pressing. Guiding rods 7 and 8 form the usual guides for the downwardly moving plunger and on these rods 7 and 8 an intermediate die 9 is guided on steel bushes 10. The intermediate die 9 is fitted at its lower part with an intermediate plunger 11 which fits the lower die 6 and carries above a die 12 which is constructed correspondingly to the upper plunger 4. On the intermediate die 9, lateral locking devices in the form of stirrups 13 are mounted on trunnions 14 of an eccentric shaft 16 and on trunnions 15 of the main die 5. The eccentric shaft 16 carrying the trunnions 14 is moved by means of a lever 17 which can be actuated by a device provided for the purpose or can be actuated by the machine itself, for example by means of an ordinary hydraulic arrangement. A catch 18 holds the lever 17 and with it the trunnions 14 in the tensioned position. The main plunger 3, like the main die 5, is provided with trunnions 19 to which the stirrups 13 can be attached, in which case the lever 17 for stressing the eccentric in Fig. 1 is turned to the left through 180° and the catch 18 is fixed in the bolt hole 20. The intermediate die, like the main die 5 and the main plunger 3, is provided with connections 21 for introducing a cooling medium, for example compressed air.

The pressing operation is carried out as follows with the machine illustrated:

When simultaneously pressing two articles made from laminated artificial resin material, the intermediate die is brought into a middle position in such a manner that both dies 6 and 12 can be charged with material. After the filling the intermediate die is lowered on to the main die 5 and, by means of the main plunger 3, both parts are simultaneously pressed with the pressure of 300 to 400 kilograms per square centimeter, which is required for artificial resin laminated material, the pressure used being determined according to the properties of the material. After the pressure indicator has come to rest at the desired value, calculated for example at 350 kilograms per square centimeter and the pressure has been maintained for a time according to the material being used, the pressings are cooled while maintaining the pressure by compressed air or other cooling agent being admitted through the connections 21.

In successive pressing and cooling, for example, the lower die is charged with material and the article is pressed by means of the plunger 11 provided on the intermediate die 9, the stirrups 13 being connected with the main die 3. When the material yields no further the stirrups 13 are turned downwards and attached to the trunnions 15, while at the same time the eccentric shaft 16 is fixed by means of the lever 17. Then the main plunger 3 is removed from the intermediate die and the die 12 is charged. (This operation is illustrated in Figs. 1 and 2.) After this the article in the die 12 is pressed by means of the main plunger 3, and during this time, after the attachment of the locking devices 13, the lower pressing is cooled. After the cooling of the lower pressing the locking device is again attached to the main plunger 3 and the lower die is emptied, after which the operation is repeated.

At the first charging of the upper or of the lower die when pressing on the empty die a spacing ring 22, shown in the figures in broken lines, is preferably inserted in order to avoid damage to the surfaces of the die and plunger.

The new method is suitable for all pressed materials in which the pressing is cooled under pressure after being pressed at the highest temperature. It is also suitable for artificial resin pressed materials which require high pressure at the highest temperature, as for example, all artificial resin materials which are reinforced with laminated material such as paper, fabric, fibrous materials and the like.

What I claim is:

In a press, a main die, guide posts extending upwardly from said die, a main plunger movable on said guide posts, an intermediate die and plunger movable on said guide posts, a trunnion on said main die, a trunnion carried by said main plunger, a shaft rotatably mounted on the intermediate die, a trunnion carried by the shaft eccentrically arranged with respect to the axis of said shaft, a stirrup swingably arranged on the trunnion of said shaft adapted to engage the trunnion of the main die or the trunnion of the main plunger, and a lever for rotating said shaft.

FRITZ SCHNELL.